United States Patent [19]

Carter et al.

[11] 4,293,678
[45] Oct. 6, 1981

[54] RADIATION-CURABLE ACRYLATED EPOXY SILICONE COMPOSITIONS

[75] Inventors: Richard G. Carter, Charleston; Stuart L. Watson, Jr., South Charleston, both of W. Va.; Arthur N. Pines, Katonah, N.Y.

[73] Assignee: Union Carbide Corporation, New York, N.Y.

[21] Appl. No.: 97,446

[22] Filed: Nov. 26, 1979

[51] Int. Cl.$^3$ .............................................. C08G 77/20
[52] U.S. Cl. ............................... 528/32; 204/159.13; 526/279; 528/26; 528/41; 556/437; 556/466; 556/467
[58] Field of Search ........... 526/279; 528/26, 32, 528/41; 556/437, 466, 467; 204/159.13

[56] References Cited

U.S. PATENT DOCUMENTS

| | | | |
|---|---|---|---|
| 3,650,813 | 3/1972 | Nordstrom et al. | 117/93.31 |
| 3,878,077 | 4/1975 | Borden et al. | 204/159.16 |
| 3,878,263 | 4/1975 | Martin | 260/825 |
| 4,064,027 | 12/1977 | Gant | 204/159.13 |
| 4,064,286 | 12/1977 | Hahn | 427/44 |
| 4,139,513 | 2/1979 | Tanaka et al. | 526/279 |
| 4,139,548 | 2/1979 | Tanaka et al. | 556/437 |
| 4,139,692 | 2/1979 | Tanaka et al. | 526/279 |

FOREIGN PATENT DOCUMENTS

| | | |
|---|---|---|
| 2233514 | 1/1973 | Fed. Rep. of Germany . |
| 1433461 | 4/1976 | United Kingdom . |

*Primary Examiner*—Melvyn I. Marquis
*Attorney, Agent, or Firm*—Francis M. Fazio

[57] ABSTRACT

A class of materials termed acrylated epoxy silicones have been synthesized. In one of its simplest forms, the final product can be the reaction product of an epoxy silicone and acrylic acid. These novel materials can be used per se or in formulations as coatings compositions that are readily cured to yield solid, protective, high gloss films.

5 Claims, No Drawings

RADIATION-CURABLE ACRYLATED EPOXY SILICONE COMPOSITIONS

BACKGROUND OF THE INVENTION

Coatings play a useful role in the manufacture of a great many articles which find wide use in nearly all facets of contemporary life. Until recently, nearly all coatings were applied with employment of a hydrocarbon based solvent which evaporated leaving the dried coating on the article which was to be coated. This system met with increasing disfavor as the cost of energy needed to drive off the solvent at the rate required by industry increased, as the price of the organic solvent itself increased and as the deleterious environmental effects of the evaporated solvent became better understood. Systems aimed at solvent recovery to reduce pollution and conserve solvent have generally proven to be energy intensive and unacceptable.

In response, those skilled in the art have devised a class of coatings termed radiation-curable coatings. In one type of radiation-curing termed photocuring a solution of a photoinitiator in a reactive coating liquid is employed. The liquid approaches a pollution-free system as almost all of the liquid is converted to cured coating with little or no solvent emission upon the brief exposure of the coated substrate to ultraviolet light. The ultraviolet light equipment generally has a low demand for electrical energy and thus many technical and cost deficiencies caused by the pollution and energy problems of organic solvent systems are overcome.

As more and more applications for radiaton-curable systems are attempted there developed a need for greater varieties of radiation-curable contacts having differing characteristics in their properties both before and after curing. One such application, the use of photocurable coatings as varnishes over printing ink, requires the photocurable material to have a low viscosity before curing, cure rapidly upon exposure to radiation and have a high degree of gloss after curing. A radiation-curable coating having these characteristics would be of great advantage.

SUMMARY OF THE INVENTION

It has now been found that new class of materials termed acrylated epoxy silicones, which are hereinafter more fully described and which are the reaction product of an epoxy silicone with acrylic acid, can be produced and used in radiation-curable formulations. The resulting radiation-curable coating has a low viscosity before curing facilitating application to the substrate, is rapidly cured by exposure to ultraviolet radiation allowing efficient employment in modern high volume industrial applications and cures to a high gloss finish and thus is an ideal coating for many uses such as a varnish over printing ink.

DESCRIPTION OF THE INVENTION

The novel acrylated epoxy silicones of this invention can be represented by the general formula:

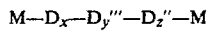

wherein
M is an $R_3SiO_{0.5}$ group;
D is an

group;
D" is an

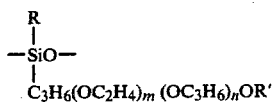

group;
D'" is an

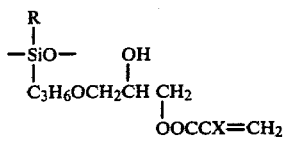

or an

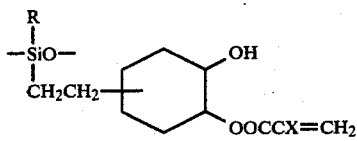

group;
X is hydrogen or methyl;
R is an alkyl group having from 1 to 5 carbon atoms, a cycloalkyl group having from 5 to 7 ring carbon atoms, an aryl group having 6 ring carbon atoms, or an alkoxy group having from 1 to 3 carbon atoms;
R' is an alkyl group having from 1 to 5 carbon atoms;
m is an integer having a value of from about 0 to 25;
n is an integer having a value of from about 0 to 25;
x is an integer having a value of from 0 to about 100;
y is an integer having a value of from 1 to about 5; and
z is an integer having a value of from 0 to about 10.

The position of the hydroxyl and the acrylic moieties may be as represented or may be reversed. The silicone backbone of the main chain may be linear, branched or cyclic and may be continuous or discontinuous being a random arrangement of the D, D' and D'" groups as is known to those skilled in the art; in addition those skilled in the art are aware of the fact that the ethyleneoxy and propyleneoxy groups can be random or block in the molecule structure.

The acrylated epoxy silicones are produced by the reaction of acrylic acid or methacrylic acid with an epoxy silicone. The suitable epoxy silicones can be represented by the general formula:

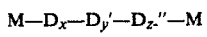

wherein M, D, D", x, y and z are as hereinbefore defined and wherein D' is an

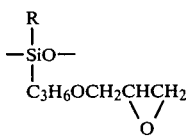

group or an

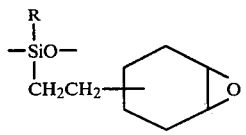

group. The epoxy silicones are well known to those skilled in the art and many are commercially available. Thus, in addition to those indicated above, any other epoxy silicone having an oxirane group directly or indirectly attached to the siloxane backbone chain of the silicone molecule can be used.

The reaction of the epoxy silicone with acrylic acid or methacrylic acid can be carried out at a temperature of from about 25° C. to 130° C., preferably from about 60° C. to 100° C.

The reaction can be run at atmospheric, subatmospheric or superatmospheric pressure; the preferred pressure is atmospheric.

The time of the reaction will vary and is dependent to some extent on such variables as the specific reactants, the reaction conditions and the size of the batch.

The reaction will proceed uncatalyzed but a catalyst may be employed. Among the many useful catalysts known to those skilled in the art one can name 1,4-diazabicyclo[2.2.2]octane as being particularly effective. Illustrative of the many other useful catalysts one can name p-toluene sulfonic acid, methane sulfonic acid, trifluoroacetic acid, morpholine, tributylamine, benzyldimethyl amine, and the like.

The acrylic or methacrylic acid is present in the reaction mixture at concentration of from 2 weight percent to 40 weight percent preferably from 5 weight percent to 25 weight percent based on the weight of the epoxy silicone. The amount used will vary depending on the oxirane equivalents present. In general an amount sufficient to react with essentially all of the oxirane groups is used.

The catalyst, if employed, can be present at from 0.05 weight percent to 3.0 weight percent preferably from 0.1 weight percent to 2.0 weight percent based on the weight of the epoxy silicone.

In a typical synthesis the epoxy silicone and catalyst are charged to a reaction vessel and the acrylic acid is added dropwise at the desired temperature. The reaction mixture is heated and stirred until the production of acrylated epoxy silicone is completed.

The acrylated epoxy silicone compounds of this invention can be used per se as coating compositions, either alone or in admixture with conventional solvents, pigments, crosslinkers, fillers and other additives. They can be applied by conventional means and cured by exposure to heat, light, electron radiation, X-ray radiation, or any other known means of curing and crosslinking.

The acrylated epoxy silicone compounds may also be formulated with reactive solvents to produce coating compositions known as 100 percent solid coating compositions. These reactive solvents are well known to those skilled in the art of formulating radiation-curable coatings and include a wide variety of unsaturated monomers and obligomers such as styrene, alpha-methyl styrene and acrylyl compounds such as the acrylate esters, the methacrylate esters, the acrylamides and the methacrylamides. The reactive solvents may be present at a concentration of up to 70 weight percent preferably from 10 weight percent to 40 weight percent based on the total weight of the coating composition.

The coating compositions can contain up to 10 weight percent of a photoinitiator or combinations thereof when they are to be cured by light radiation. These photoinitiators are well known to those skilled in the art and illustrative thereof one can name 2,2-diethoxyacetophenone, benzophenone, p-methyoxybenzophenone, acetophenone, propiophenone, xanthone, benzoin, benzil, benzaldehyde, naphthoquinone, anthraquinone, dicumyl peroxide, t-butyl hydroperoxide, t-butyl peracetate, benzoyl peroxide, and the like. One of the preferred photoinitiators for curing with ultraviolet radiation under an inert atmosphere is 2,2-diethoxyacetophenone at a concentration of from 1 weight percent to e weight percent based on the total weight of the coating composition.

The coating compositions can be applied by conventional means including, spray, curtain, dip, pad, rollcoating and brushing procedures. They can be applied to any acceptable substrate such as wood, metal, glass, fabric, paper, fiber or plastic that is in any form.

The coating compositions containing the acrylated epoxy silicone compounds of this invention can be cured by exposure to heat or radiation. When cured by heat, any of the known free radical activators can be present at the conventional concentrations. The radiation can be ionizing radiation, either particulate or non-particulate, or non-ionizing radiation. A particularly useful type of radiation is ultraviolet radiation at a flux density of from about 100 watts to about 1000 watts per square foot of source projected area.

Of particular interest is the use of the radiation curable coating formulated with the acrylated epoxy silicones of this invention; a low-viscosity varnishes for application over conventional oil-based, printing ink. These coatings, when cured, provide the unique combination of desirable low viscosity, good cured film flexibility, good adhesion, and a high level of specular gloss.

The following examples serve to further illustrate the invention.

EXAMPLE 1

There were charged to a 250 ml round-bottom three-neck flask equipped with a thermometer, heating mantle, dropping funnel, magnetic stirrer and dry air blanket 100 grams of an epoxy silicone having a formula of MD'M where M is

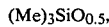

D' is

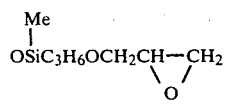

and Me is methyl, and 1 gram of 1,4-diazabicyclo[2.2.2]octane as catalyst. The solution was heated to 90° C.

with stirring and 21.4 grams of acrylic acid was added dropwise. The reaction mixture was stirred at 90° for about 30 hours. The acrylated epoxy silicone residue product was cooled to room temperature and 0.01 gram of hydroquinone monoethyl ether, as stabilizer, was added. The acrylated epoxy silicone residue product was a light yellow liquid with a viscosity of 3 centistokes and had the chemical formula

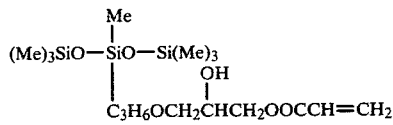

EXAMPLE 2

To the reaction product of Example 1 there was added 2 weight percent of 2,2-diethoxyacetophenone as photoinitiator. A film of this mixture was cast on a sheet of coated offset paper using a hand proofer equipped with a steel metering roll engraved with a 180-line-per-inch quadragravure cell pattern. The effective film thickness obtained was about 0.2 mil. The film was cured in a photocuring unit under nitrogen by exposure to an ultraviolet flux density of about 500 watts per square foot for a period of time of about 0.3 second. The film cured to a dry, glossy, highly flexible coating on the surface of the paper sheet.

EXAMPLE 3

There was charged to a 100 ml round-bottom three-neck flask equipped with a thermometer, heating mantle, dropping funnel, magnetic stirrer and dry air blanket 50 grams of an epoxy silicone having a formula of $MD_{30}D'_{3.5}M$ where M is

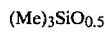

and D is

and D' is

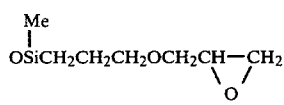

After heating to 60° C. there was added 0.2 gram of 1,4-diazabicyclo[2.2.2]octane as catalyst. The resulting solution was heated to 90° C. with stirring, 3.9 grams of acrylic acid was added and the reaction mixture was stirred at about 90° C. for twenty-four hours. The acrylated epoxy silicone having a Ubbelohde viscosity of 1020 centistokes was recovered as the residue product. This silicone had the general formula $MD_{30}D'_{3.5}M$ where M and D are as previously defined and where D' is

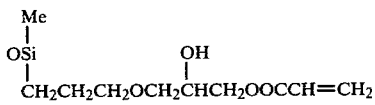

EXAMPLE 4

Eight varnishes were formulated containing the components described in Table I. Four of the varnishes were formulated using the acrylated epoxy silicone reaction product of Example 1 and for comparative purposes the other four varnishes were formulated using a tetrafunctional polyester acrylate, an acrylate ester frequently used in radiation-curable formulations which had about the same viscosity as the acrylated epoxy silicone of Example 1. Also used in each formulation were 2 parts by weight of diethoxyacetophenone as photoinitiator and 1 part by weight of a flow control agent having the formula

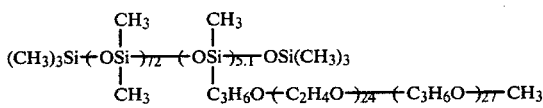

TABLE I

| Formulation | (Composition in parts by Wt.) | | | | | | | |
|---|---|---|---|---|---|---|---|---|
| | 1 | 2 | 3 | 4 | 5 | 6 | 7 | 8 |
| Acrylated Epoxy Silicone of Ex. 1 | 97 | — | 72 | — | 72 | — | 72 | — |
| Tetra-functional Polyester Acrylate | — | 97 | — | 72 | — | 72 | — | 72 |
| Trimethylolpropane Triacrylate | — | — | 25 | 25 | 20 | 20 | 20 | 20 |
| Isodecyl Acrylate | — | — | — | — | 5 | 5 | — | — |
| Phenoxyethyl Acrylate | — | — | — | — | — | — | 5 | 5 |
| Viscosity (cps. at 25° C.) | 1000 | 100 | 490 | 500 | 370 | 390 | 400 | 420 |

The varnish formulations described in Table I were used to overprint a film of uncured, oil-base ink on clay-coated, offset paper. The ink films were cast with a hand proofer using a large charge of black ink. The overprint varnish film was immediately applied over the wet ink film using a hand proofer equipped with a 180 linequadragravure engraved metering cylinder. The overprint varnish film was then cured immediately by passing through an ultraviolet photocuring unit under nitrogen; the unit delivered an ultraviolet light flux density of about 160 watts per square foot, and the exposure time was approximately 0.87 second. After aging 20 hours, during which the oil-base ink was allowed to cure by air oxidation of the contained drying oils, the coated ink films were evaluated for gloss, flow-out, scratch resistance, and adhesion. The properties of the overprint varnish are shown in Table II.

TABLE II

| Test | Formulation | | | | | | | |
|---|---|---|---|---|---|---|---|---|
| | 1 | 2 | 3 | 4 | 5 | 6 | 7 | 8 |
| Gloss, 60° Gardner | | | | | | | | |

TABLE II-continued

| Test | Formulation | | | | | | | |
|---|---|---|---|---|---|---|---|---|
| | 1 | 2 | 3 | 4 | 5 | 6 | 7 | 8 |
| Gloss Meter | 68 | 19 | 64 | 59 | 67 | 60 | 68 | 55 |
| Flow-out Visual | Good | Poor | Good | Fair | Good | Fair | Good | Fair |
| Scratch Resistance, Fingernail | Fair | Brit. | Good | Brit. | Good | Fair | Good | Fair |
| Adhesion "Scotch-Tape" % Remaining | 100 | 20 | 100 | 0 | 100 | 25 | 100 | 20 |

The results establish the improved properties of radiation-curable coatings formulated with the acrylated epoxy silicones of this invention as compared to comparable radiation-curable coatings formulated with a previously known radiation curable composition.

What is claimed is:

1. Acrylated epoxy silicones of the general formula:

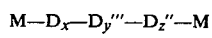

wherein
M is an $R_3SiO_{0.5}$ group;
D is an

group;
D" is an

group;
D''' is an

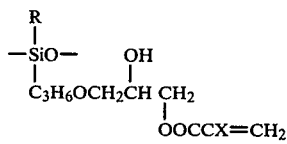

or an

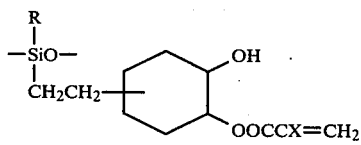

group;
X is hydrogen;
R is an alkyl group having from 1 to 5 carbon atoms, a cycloalkyl group having from 5 to 7 carbon atoms, an aryl group having 6 ring carbon atoms, or an alkoxy group having from 1 to 3 carbon atoms;
R' is an alkyl group having from 1 to 5 carbon atoms;
m is an integer having a value of from about 0 to 25;
n is an integer having a value of from 0 to 25;
x is an integer having a value of from 0 to about 100;
y is an integer having a value of from 1 to about 5; and
z is an integer having a value of from 0 to about 10; and wherein the silicone backbone may be linear, branched or cyclic and may be continuous or discontinuous being a random arrangement of the D, D" and D''' groups.

2. An acrylated epoxy silicone as claimed in claim 1 having the formula

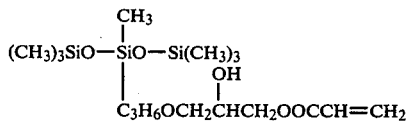

3. An acrylated epoxy silicone as claimed in claim 1 having the general formula $MD_{30}D'_{3.5}M$ wherein
M is $(CH_3)_3SiO_{0.5}$
D is $(CH_3)_2SiO$
and D' is

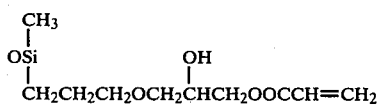

4. In a heat curable or radiation curable composition the improvement comprising including in the formulation of said composition an acrylated epoxy silicone of the general formula:

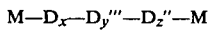

wherein
M is an $R_3SiO_{0.5}$ group;
D is an

group;
D" is an

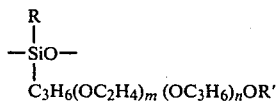

group;
D''' is an

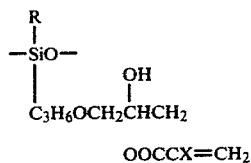

or an

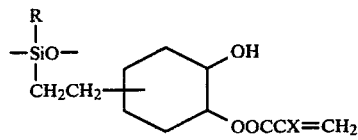

group;
X is hydrogen;
R is an alkyl group having from 1 to 5 carbon atoms, a cycloalkyl group having from 5 to 7 ring carbon atoms, an aryl group having 6 ring carbon atoms, or an alkoxy group having from 1 to 3 carbon atoms;
R' is an alkyl group having from 1 to 5 carbon atoms;
m is an integer having a value of from about 0 to 25;
n is an integer having a value of from 0 to 25;
x is an integer having a value of from 0 to about 100;
y is an integer having a value of from 1 to about 5; and
z is an integer having a value of from 0 to about 10;
and wherein the silicone backbone may be linear, branched or cyclic and may be continuous or discontinuous being a random arrangement of the D,D'' and D''' groups.

5. An improved heat curable or radiation curable composition as claimed in claim 4 wherein said acrylated epoxy silicone has the formula

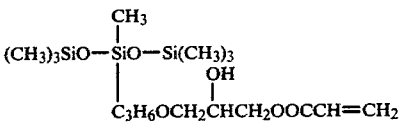

* * * * *

UNITED STATES PATENT AND TRADEMARK OFFICE
CERTIFICATE OF CORRECTION

PATENT NO. : 4,293,678
DATED      : October 6, 1981
INVENTOR(S): R. G. Carter, et al.

It is certified that error appears in the above—identified patent and that said Letters Patent is hereby corrected as shown below:

At column 4, line 3 replace "obligomers" with --oligomers--.

At column 4, line 23 replace "e" with --3--.

At column 9, lines 1-8 the first formula for D''' in claim 4 should read

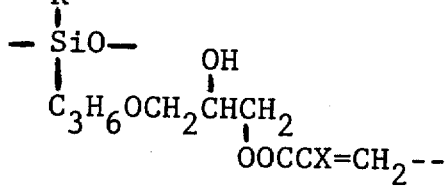

Signed and Sealed this

Second Day of February 1982

[SEAL]

Attest:

Attesting Officer

GERALD J. MOSSINGHOFF

Commissioner of Patents and Trademarks